No. 706,262. Patented Aug. 5, 1902.
R. C. SEYMOUR.
MACHINERY FOR FOLDING, PACKING, AND STACKING SHEETS OF PAPER, &c.
(Application filed Mar. 29, 1902.)
(No Model.)
9 Sheets—Sheet 1.
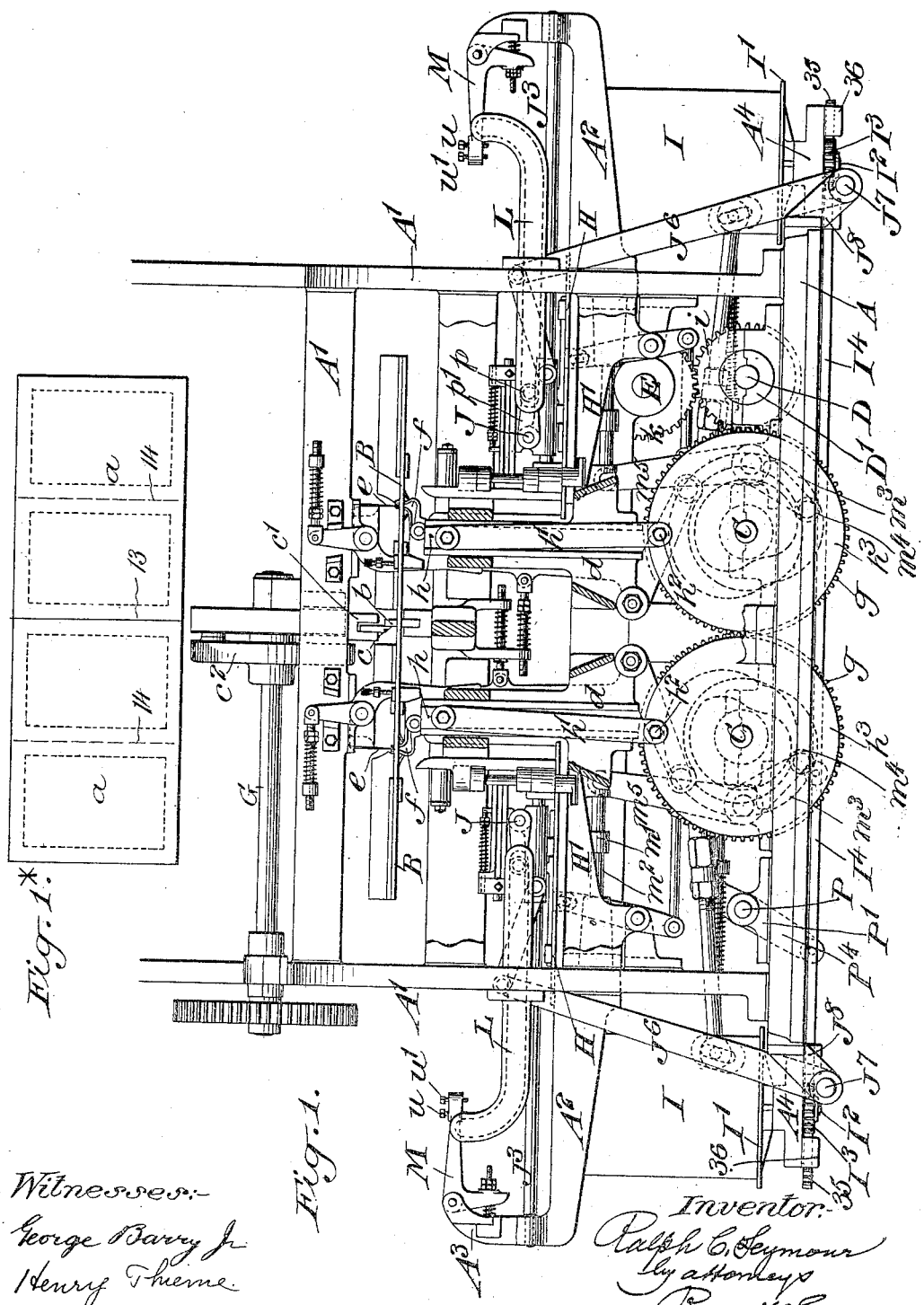

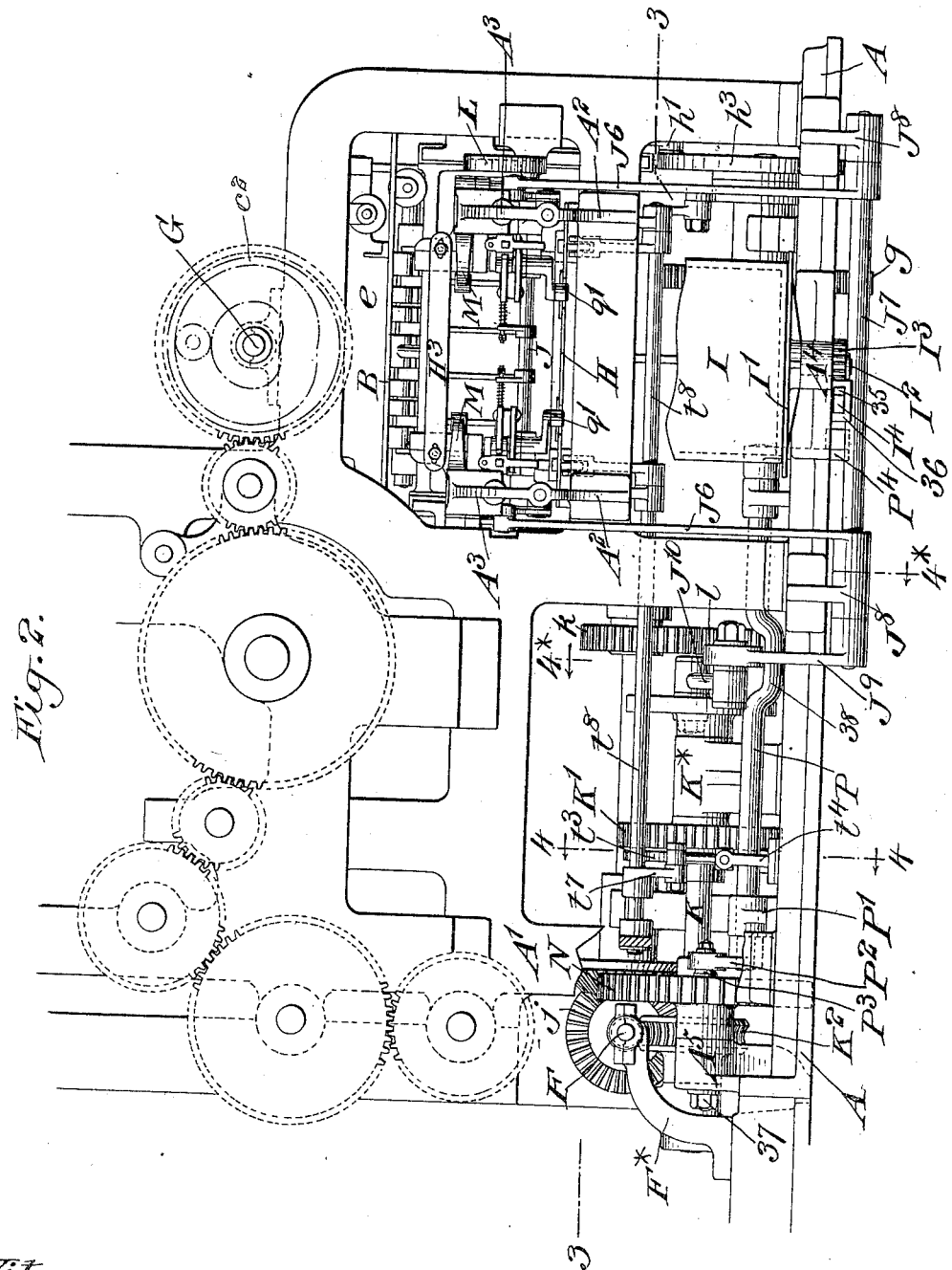

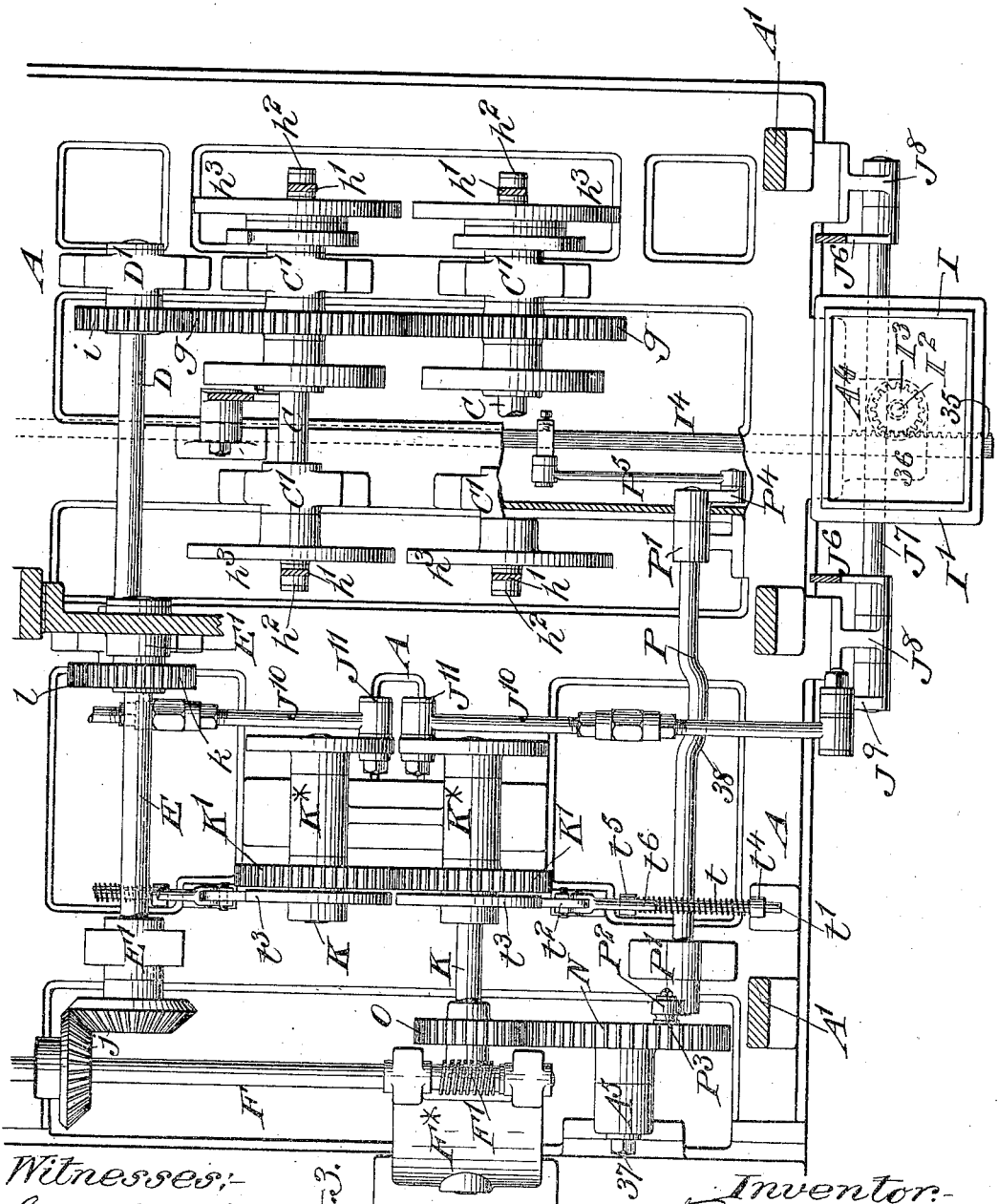

No. 706,262. Patented Aug. 5, 1902.
R. C. SEYMOUR.
MACHINERY FOR FOLDING, PACKING, AND STACKING SHEETS OF PAPER, &c.
(Application filed Mar. 29, 1902.)
(No Model.) 9 Sheets—Sheet 4.
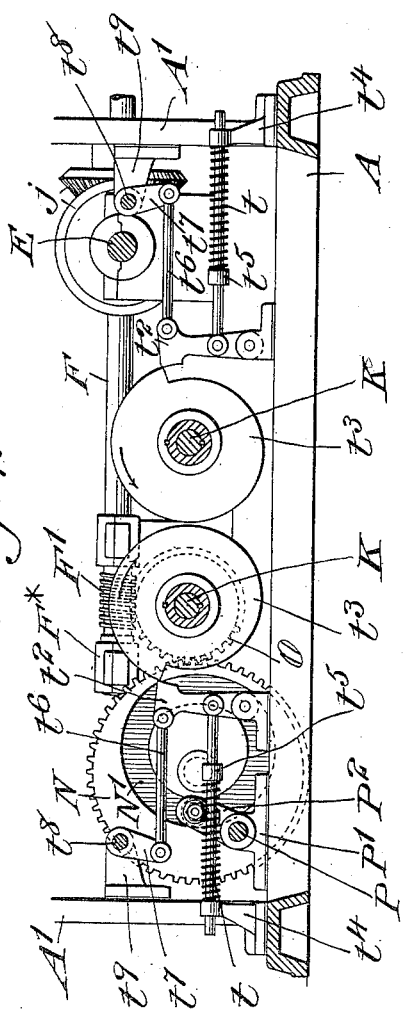
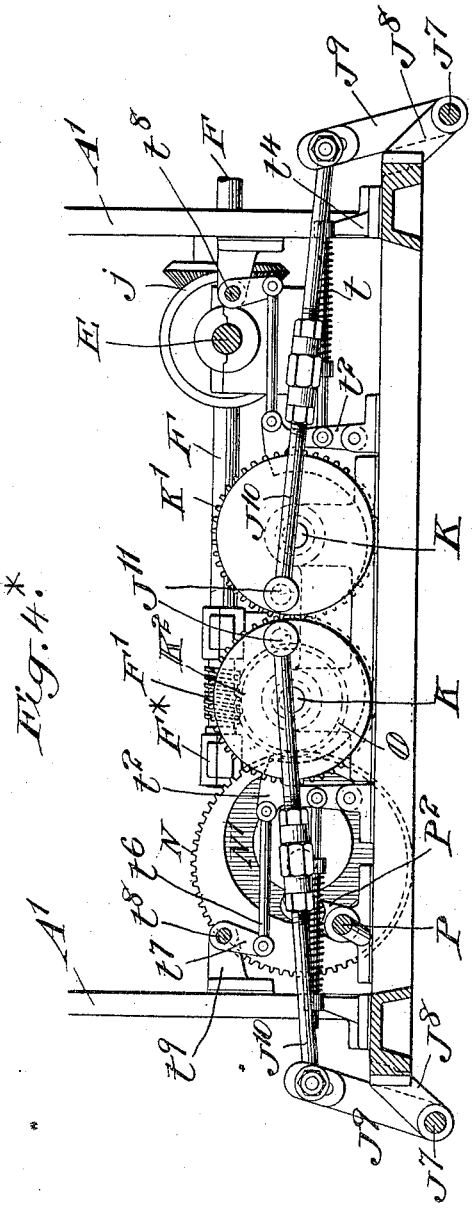
Witnesses:-
George Barry Jr
Henry Thieme
Inventor:-
Ralph C. Seymour
by attorneys
Brown & Seward

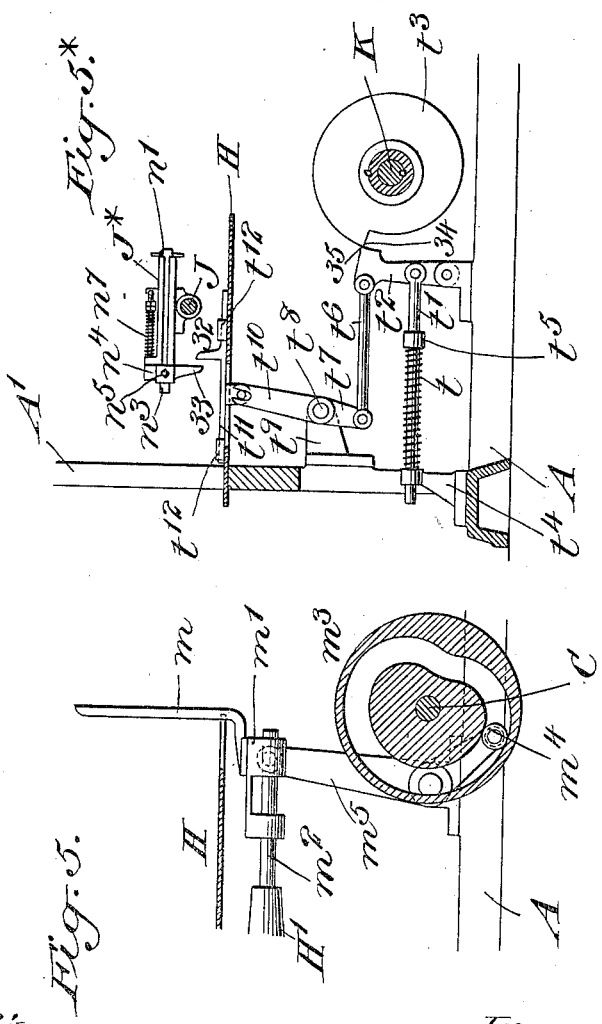

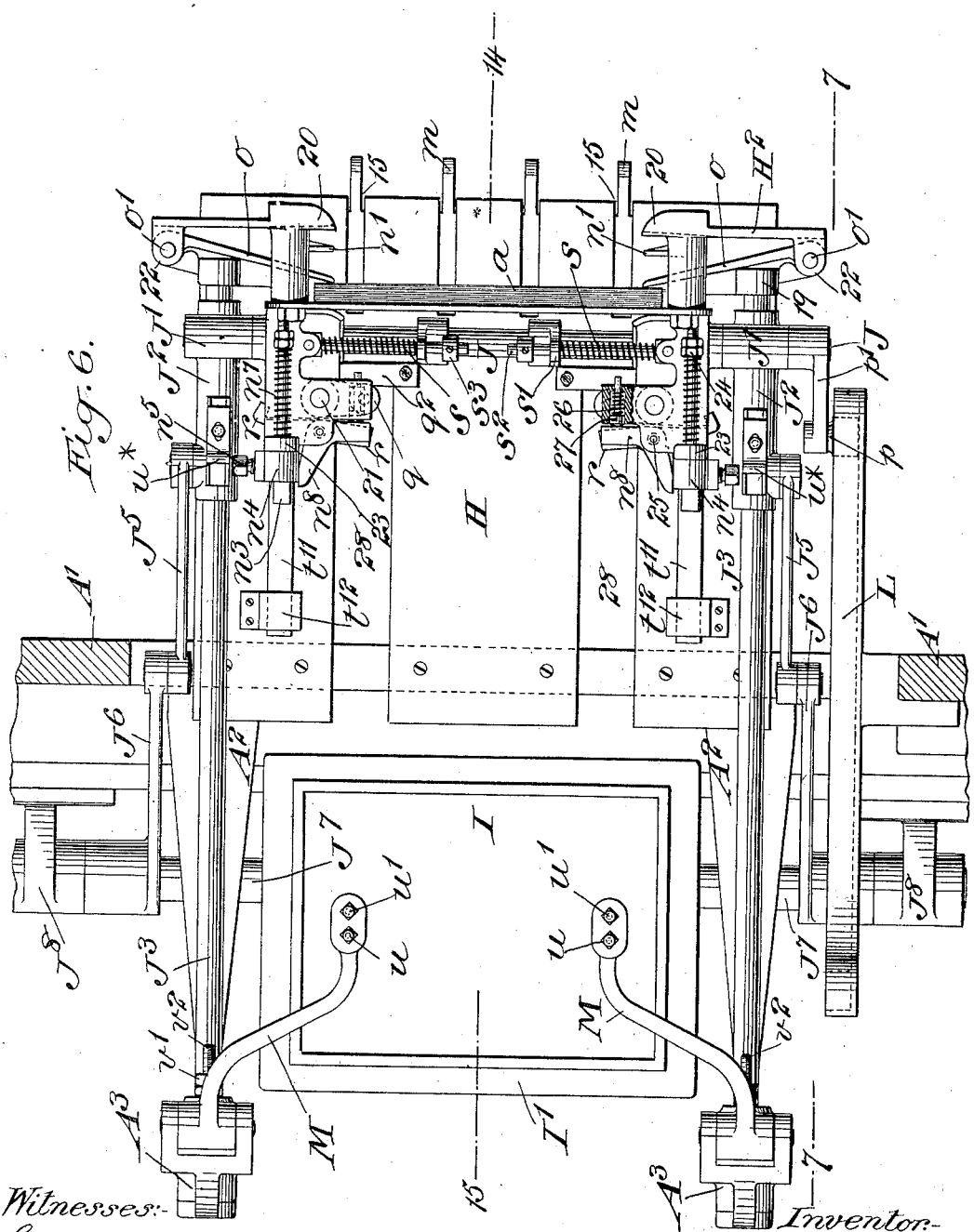

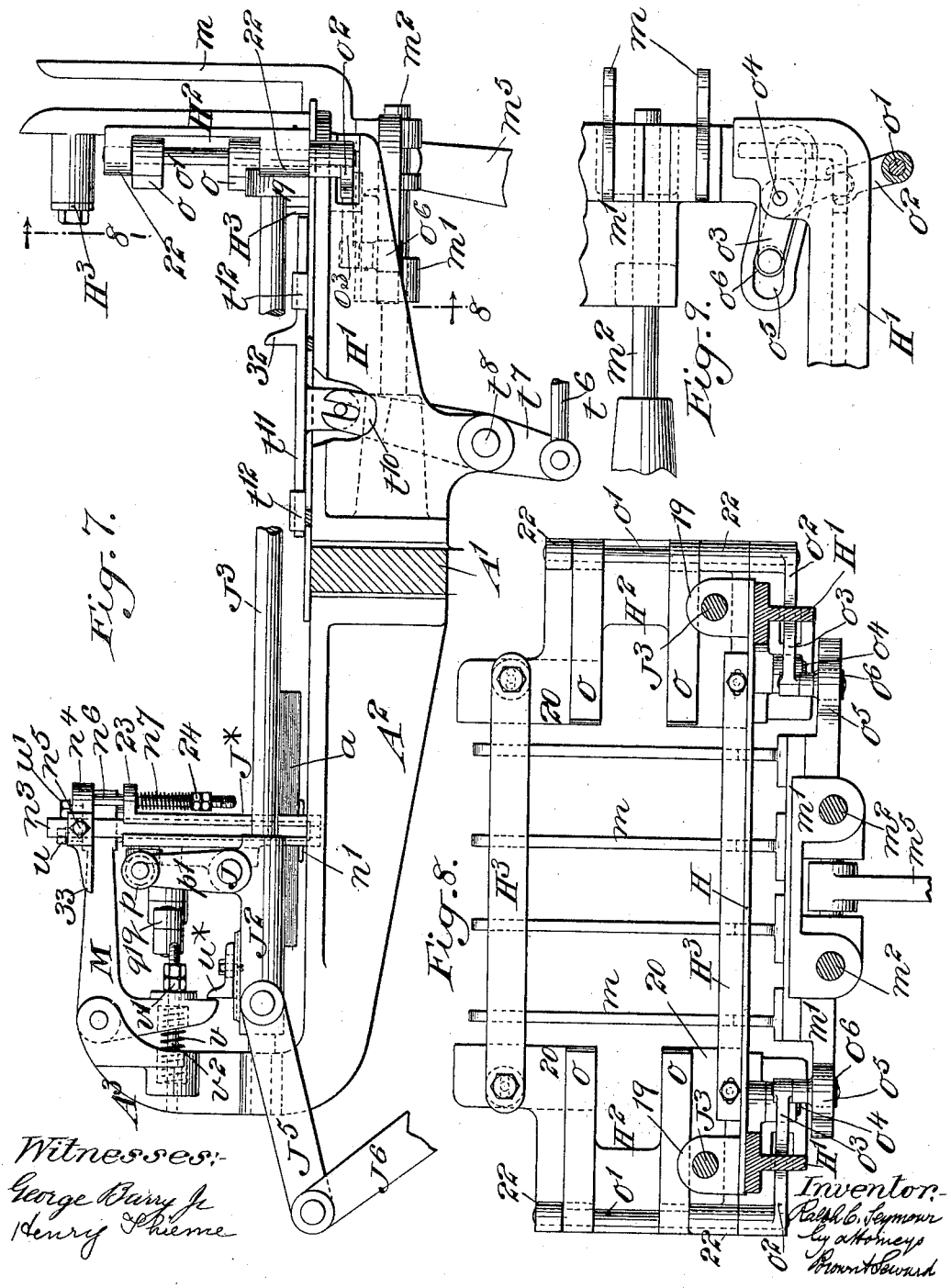

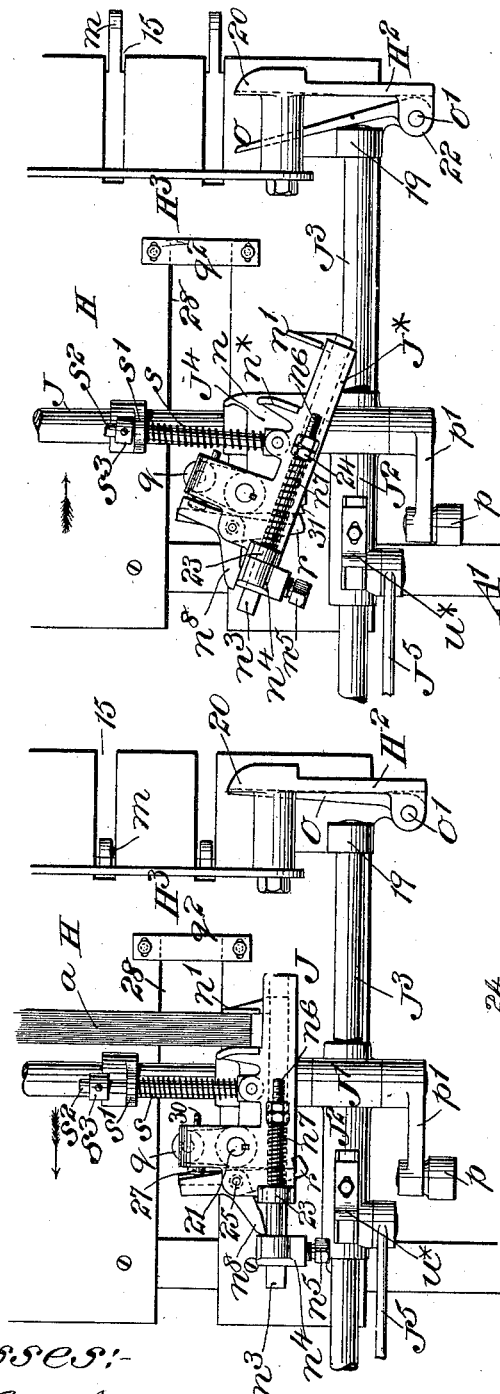

No. 706,262. Patented Aug. 5, 1902.
R. C. SEYMOUR.
MACHINERY FOR FOLDING, PACKING, AND STACKING SHEETS OF PAPER, &c.
(Application filed Mar. 29, 1902.)
(No Model.)
9 Sheets—Sheet 9.
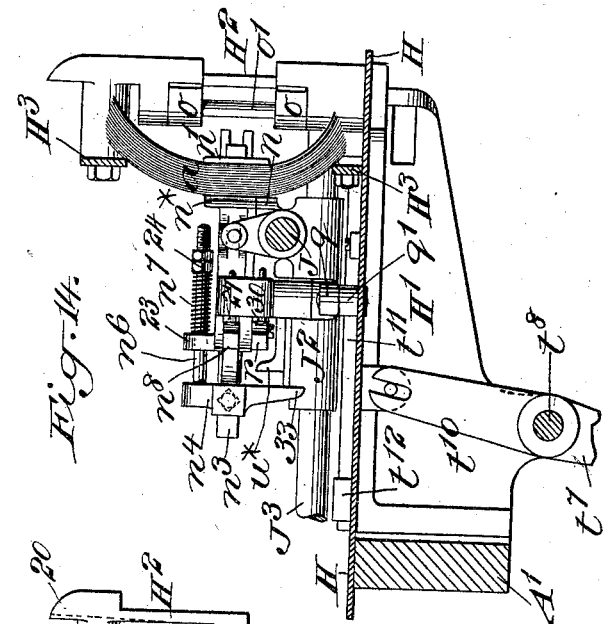
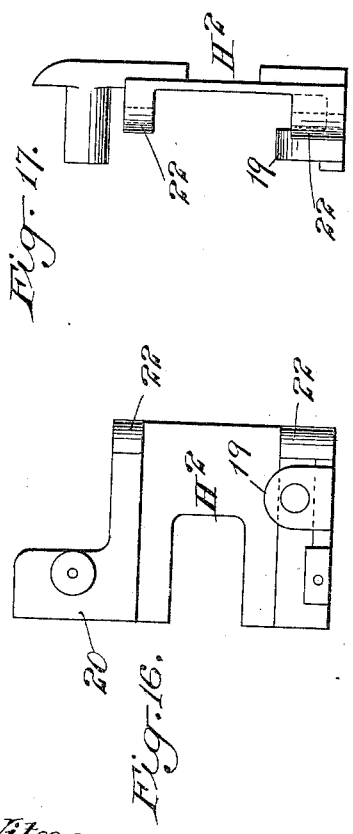
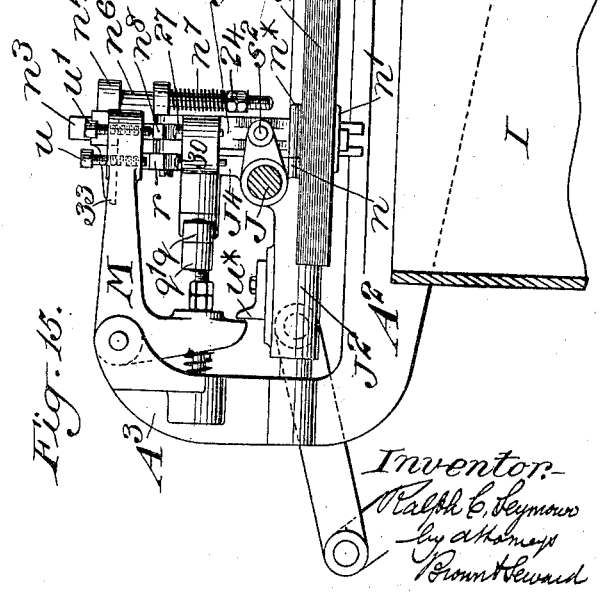
Witnesses:—
George Barry Jr.
Henry Thieme
Inventor:—
Ralph C. Seymour
by attorneys
Brown & Seward

UNITED STATES PATENT OFFICE.

RALPH C. SEYMOUR, OF SOUTH ORANGE, NEW JERSEY, ASSIGNOR TO C. B. COTTRELL & SONS COMPANY, OF NEW YORK, N. Y., A CORPORATION OF NEW JERSEY.

MACHINERY FOR FOLDING, PACKING, AND STACKING SHEETS OF PAPER, &c.

SPECIFICATION forming part of Letters Patent No. 706,262, dated August 5, 1902.

Application filed March 29, 1902. Serial No. 100,568. (No model.)

*To all whom it may concern:*

Be it known that I, RALPH C. SEYMOUR, a citizen of the United States, and a resident of South Orange, in the county of Essex and State of New Jersey, have invented a new and useful Improvement in Machinery for Folding, Packing, and Stacking Sheets of Paper and other Fabrics, of which the following is a specification.

The principal object of this invention is the collection one by one of folded sheets delivered from the folding devices of a folding-machine, the packing of the so-collected sheets into packs each comprising any suitable number of them, and the deposit of said packs in stacks in a box or receptacle in which they may be conveniently taken away for binding or for any other future operation.

An important feature of the invention is the provision for the turning of such box or receptacle from time to time between the successive deposits of the packs therein for the purpose of arranging the packs with their folded edges in opposite directions alternately, and thereby obtaining in the boxes evenly-laid stacks of packs.

To enable others skilled in the art to make and use my invention, I will first describe it with reference to the accompanying drawings and afterward point out its novelty in claims.

The drawings illustrate the invention in connection with the cutting and folding machine which is the subject of United States Patent No. 668,393, such machine serving as well as any other for such illustration. This machine contains two sets of folding devices, two corresponding sets of packing devices, and two corresponding stacking-boxes.

Figure 1 represents a front elevation of the machine with part of the front of the framing omitted to better show the working parts; Fig. 1*, a plan of one of the sheets to be presented to this machine to be cut into two, which are to be separately folded and of which one is to be taken by one set of packing devices to one of the stacking-boxes and the other is to be taken by the other set of packing devices to the other stacking-box; Fig. 2, a left-hand side elevation corresponding with Fig. 1 of such parts of the machine as are necessary to illustrate the invention; Fig. 3, a horizontal section of the machine in the line 3 3 of Fig. 2, omitting one of the two stacking-boxes and its operating mechanism; Figs. 4 and 4*, vertical sections of the lower part of the machine, taken, respectively, on the lines 4 4 and 4* 4* of Fig. 2 and viewed from the right of said lines; Fig. 5, a view parallel with Fig. 1 of one of the sheet-packers and its operating mechanism; Fig. 5*, a front elevation of parts of the pack-carrying devices and their operating mechanism; Fig. 6, a plan of one set of sheet-packing and pack-carrying devices and their corresponding stacking-box; Fig. 7, a vertical section on the line 7 7 of Fig. 6; Figs. 8 and 9, plan views of details corresponding with Fig. 7; Figs. 10 and 11, plan views of details of the sheet-packing and pack-carrying devices corresponding with Fig. 6; Fig. 12, a vertical sectional view, which will be hereinafter explained, corresponding with Fig. 10; Figs. 13 and 13*, plan views of some of the details corresponding with Figs. 10, 11, 12; Figs. 14 and 15, vertical sectional views on the line 14 15 of Fig. 6; Figs. 16, 17, 18, elevations of one of the details of the packing devices to be hereinafter explained. Figs. 1 to 5 correspond in their scale, and Figs. 6 to 18 are on a corresponding scale larger than that of Figs. 1 to 5.

A designates a bed-plate on which is erected the stationary framing A' of the machine; B, a stationary table on which the sheets such as are represented in Fig. 1* are deposited by any suitable means to be cut into two sheets $a\ a$ on the line 13 of that figure by suitably-arranged shears $b\ c$, Fig. 1, of which the blade $b$ is stationary and the blade $c$ is carried by a stock $c'$, which derives a reciprocating motion from a crank $c^2$ on a shaft G, to which rotary motion may be given by any suitable means. On opposite sides of the shears $b\ c$ are the two sets of folding devices for folding the sheets $a\ a$ on the lines 14. These folding devices consist each of a creasing-blade $e$, arranged above the table B, and gripping-jaws or grippers $f$, attached to one of two bars or carriers $h$, to which are given vertical reciprocating movements in guides $d$ to take the jaws of the grippers $f$ through the slots in the folding-table B for the purpose of creasing the sheets in the lines 14 on the blades $e$ and drawing them down in folded condition through the slots in said table. The reciprocating movements of each gripper-carrier is produced by rods $h'$, Figs. 1 and 3, one at each end of the carrier, connecting it with duplicate crank-pins $h^2$ on duplicate disks $h^3$ on one of two horizontal shafts C, which run in bearings C' on the bed-plate A. These shafts C are geared together by spur-gears $g$, and rotary motion is imparted to both through a gear $i$ on a horizontal shaft D, which runs in bearings D' on the bed-plate.

As the cutting and folding devices and their driving shafts and gearing hereinabove described resemble in all essential particulars those which are part of the subject-matter of said Letters Patent No. 668,393, no further description of them is here necessary, and I have only so far described them to illustrate the application of the present invention to a suitable folding-machine. The shaft D before mentioned may have rotary motion given to it by any suitable means; but it is represented as deriving its motion from the same horizontal shaft F, Figs. 3, 4, 4*, which serves, as hereinafter described, to drive the packing and stacking mechanism which constitutes the present invention. This shaft F may derive its motion directly from a printing-machine by which the sheets $a$, Fig. 1*, have been printed. It is represented as supported in bearings in a gooseneck-standard F*, Figs. 2 and 3, but has another bearing. (Not shown.) The said shaft F is geared with the shaft D through a horizontal shaft E, which works in fixed bearings E' on the bed-plate A, the said shaft E being geared with F by bevel-gears $j$ and with D by spur-gears $k$ $l$.

H H are the packing-tables, one for each set of folding devices, for the reception of the folded sheets which are dropped upon them edgewise and upright by the opening of the grippers $f$. These tables are supported on brackets H', (see Figs. 1 and 7,) secured to the main framing A'. The said packing-tables and all the appurtenant packing and stacking devices belonging to the two are alike, except that they are arranged in opposite directions with respect to the folding devices, as may be understood by reference to Fig. 1, and therefore the following description of those which are represented in that figure at the left-hand side of the machine will be sufficient for both.

The packer is of well-known construction, consisting of upright fingers $m$, which are carried by a horizontal bar $m'$ below the table H, in the inner end of which there are slots 15 (see Fig. 6) for the passage of said fingers. The bar $m'$ is fitted to run back and forth on two short stationary horizontal bars $m^2$, (see Figs. 1, 5, 7, 8,) which are carried by the bracket H'. The movement of this packer is obtained from a side-grooved cam $m^3$, Fig. 5, on one of the shafts C, which operates on a truck-roll $m^4$ on the lower end of a lever $m^5$, and the upper end of which is connected with the slide $m'$. The packer packs the sheets against an upright open fence, which consists, as shown completely in Fig. 8, which is a back view, of two upright posts $H^2$, erected on the table H, one near each side thereof, and two transverse bars $H^3$, the lower one of which is secured to said posts immediately above the table and the upper one of which is secured to the upper parts of said posts. Fig. 16 is a front view, Fig. 17 a side view, and Fig. 18 a plan, of one of these posts separate from the machine. The said posts have on their inner front parts, as shown in Figs. 6, 10, 11, 18, flanges 20. The distance between these posts, except between the flanges 20 is, as shown in Fig. 6, slightly greater than the width of the folded sheets $a$; but the distance between the inner edges of the flanges 20, is, as shown in Fig. 6, somewhat less than the width of the folded sheets $a$, which are to be packed against the bars $H^3$ of the fence. The faces of said flanges are beveled or rounded off from said inner edge to allow the side edges of the sheets to pass by them with a slight flexure as the sheets are pushed toward the bars $H^3$ by the packer. The space between the upper edge of the lower bar $H^3$ and the lower edge of the upper bar $H^3$ is somewhat less than the upright dimensions of the sheets $a$ in order that said bars may form an abutment against which to collect and pack a sufficient number of sheets $a$ to form a pack, yet said space is sufficient to form between the posts an opening in the fence, through which the pack of sheets may be drawn, as shown in Fig. 14 and as hereinafter described, by the grippers $n$ $n^*$ $n'$, by which it is taken from the fence and carried to one of the two stacking-receptacles, represented as boxes I. These boxes are represented as each supported on one of two tables I', arranged, as shown in Fig. 1, beyond the packing-tables H at such level lower than the latter tables that the upper edges of the stacking-boxes are a little below the level of the packing-tables.

Pivoted to the back of each of the posts $H^2$, at its outer edge, are what may be called "retaining-fingers" $o$, (see Figs. 6, 7, 8, 10, 11,) which project inward far enough, as illustrated in Fig. 6, to overlap the side edges of the sheets $a$ as they are packed against the fence. The pivoting of these fingers is effected by upright spindles $o'$, to which the said fingers are fixedly secured and which pass through lugs 22, formed on the posts. To the lower ends of each of these spindles $o'$ is secured a forked arm $o^2$, (see Figs. 7, 8, 9,) which engages with the end of one arm of an elbow-lever $o^3$, which is pivoted by a pin $o^4$ to the bracket H', and the other arm of which carries a roller $o^6$, which runs in one of two slotted cams $o^5$, provided on the ends of the packer-bar $m'$. As the packer moves forward to pack the sheets the cams $o^5$, acting on the rollers, produce a backward movement of the retaining-fingers $o$, which brings them to the position shown in Fig. 10, where their points are sheathed behind the flanges 20 of the posts, and as the packer returns the said cams throw the said fingers forward behind the sheet or sheets $a$, packed against the fence, to retain them there, as shown in Fig. 6. While the sheet is being carried forward by the packing-fingers and the retaining-fingers are moving back the side edges of the sheet have to pass the tips of the retaining-fingers, which being narrow and thin might tear the said edges were it not for the flanges 20 on the posts $H^2$, which are, as shown in Fig. 8, longer in a vertical direction than the width of the fingers in the same direction and which owing to their beveled or rounded front edges produce the turning back of the edges of the sheet, so that the latter may pass the retaining-fingers without any danger of being torn thereby.

The grippers $n$ $n^*$ $n'$, one set for each side of the pack of sheets, are carried by a rock-shaft J, which turns in bearings $J'$ in two carriers $J^2$, which are fitted to run to and fro between the fence $H^2$ $H^3$ and the stacking-box table I' on two stationary guides consisting of parallel bars $J^3$, which are arranged above the packing-table H at the sides thereof. The said carriers and rock-shaft and two blocks $J^4$, fast on the rock-shaft, constitute what may be termed the "pack-carriage," of which the carriers $J^2$ form the sides. The guides $J^3$ are supported at one end in lugs 19 on the posts $H^2$ and at the other end in stationary brackets $A^2$, which project outward from the framing $A'$. The to-and-fro movement of the pack-carriage is produced through the connection of the carriers $J^2$ by rods $J^5$ with the long arms $J^6$ of a rock-shaft $J^7$, (see Figs. 1, 3, 4*,) which is arranged in bearings in stationary brackets $J^8$, secured to the bed-plate of the machine, the said rock-shaft having another arm $J^9$, connected by a rod $J^{10}$ with one of two cranks $J^{11}$ on one of two parallel rotary shafts K, (see Figs. 3, 4, 4*,) running in fixed bearings $K^*$ on the bed-plate. These shafts are geared together by gears $K'$ of similar size, and rotary motion is transmitted to them from the driving-shaft F, hereinbefore mentioned, through an endless screw $F'$ on the said shaft, meshing with a worm-gear $K^2$ on one of said shafts K. This gearing between the shafts F and K is so proportioned to the gearing between the said shaft F and the crank-shaft C, which operate the folding-grippers $f$ and the packers, that the pack-carriage, with its attached grippers $n$ $n^*$ $n'$, makes only one to-and-fro movement for as many movements of the folding-grippers $f$ and packer as there are sheets intended to be formed into a single pack against the fence $H^2$ $H^3$.

Each set of grippers $n$ $n^*$ $n'$ consists of three jaws, of which two, $n$ $n^*$, corresponding in shape, as shown in Fig. 11, are arranged one above the other for receiving the back of the pack of sheets, and the third one, $n'$, is arranged opposite to and coöperates with both $n$ and $n^*$. The lower jaw $n$ is formed on the block $J^4$, which is fast on the rock-shaft J. The upper jaw $n$, matching with $n^*$, is formed on an elbow-lever $J^*$, which is pivoted at 21 to the block $J^4$. This block is clearly shown in Fig. 13, which represents a plan of said block and of the carrier $J'$ and parts of the rock-shaft J and carrier $J^2$. The jaw $n'$ is formed on the end of the rod $n^3$, which slides lengthwise within the said lever. On the other end of this rod a cross-piece $n^4$ (see Figs. 6, 10, 11, 14, 15) is secured by a set-screw $n^5$, and to this cross-piece is attached a rod $n^6$, which works through a lug 23 on the lever $J^*$. On this rod a pushing-spring $n^7$ is coiled between the said lug 23 and a nut 24, screwed on the said rod, the said spring operating to push out the jaw $n'$ and open the grippers, as shown in Fig. 11. For the purpose of keeping the grippers closed upon the pack, as shown in Fig. 10, after they have been closed by the means to be hereinafter described for that purpose there is pivoted to the lever $J^4$ at 25 a detent $n^8$, which after said closure snaps in front of the cross-piece $n^4$, as shown in the last-mentioned figure, wherein there is shown a spring 26 for actuating said detent. This spring is contained within a cavity in the lever and acts upon the detent through a headed pin 27, working through the lever.

The gripper-levers $J^*$, with the attached gripper-jaws $n'$ $n^*$, besides the opening-and-closing movement above described and the movement to and fro between the packing-fence $H^2$ $H^3$ and the stacking-box I, have a lateral movement on the pivots 21, which attach them to their carriers $J^2$, as may be understood by comparison of Figs. 10, 11, for the purpose of receiving and liberating the packs of sheets. The jaws $n$ do not have this lateral movement; but all three jaws have a vertical pivotal movement provided for by the turning of the rock-shaft J in the bearing $J'$ of the carriers $J^2$ for the purpose of turning the packs from the upright position in which they are packed to the horizontal position in which they are stacked in the boxes I. This vertical pivotal movement of the grippers and their turning back again are produced by a stationary grooved cam L, (see Figs. 1 and 6,) attached to the framing. On this cam runs a roller $p$ on an arm $p'$, fast on one end of the rock-shaft J. The groove in this cam (shown in dotted outline in Fig. 1) is straight for the greater portion of its length, but turns upward in semicircular form at its outer end. The inward lateral pivotal movement of the gripper-levers and grippers for the purpose of taking the packs takes place just as the pack-carriage, which has been moving in the direction of the arrow shown in Fig. 11 with the grippers open, has arrived in the position shown in Fig. 6 with the grippers at the sides of the packing-fence. The inward movement of each gripper-lever and its attached grippers is produced through an arm $q$, (see Fig. 10,) which is fast on the same pivot 21 to which the gripper-lever is attached, said arm being represented as furnished at its end with a roller $q'$, (see Figs. 10, 11, 12,) which as the carriers arrive near the end of their forward movement is brought by said movement into contact, as shown in Fig. 6, with a stop $q^2$, placed across a slot 28, which is provided in the packing-table for the passage of said roller. When this inward movement is completed, the gripper-lever is locked in the position shown in Fig. 10 by means of a detent-hook $r$, which is shown in Figs. 10, 11, 12, 14, 15, and of which a separate plan view is given in Fig. 13*, which drops into a notch 31 (see Figs. 10, 11, 13) in the block $J^4$ on the rock-shaft. This detent-hook $r$ is pivoted to the gripper-lever by the same pivot 25 on which is pivoted the detent $n^8$, before described, and is actuated by a spring (not shown) and a pin 30 just like and applied to the gripper-lever in the same way as the spring 26 and pin 27, before described, which actuate the detent $n^8$. The outward lateral pivotal movement of the gripper-levers for the purpose of dropping the packs into the box I takes place after the carriers, gripper-levers, and grippers have moved back over the stacking-boxes I and the rock-shaft J and the gripper-lever and grippers have been turned to bring the pack to the horizontal position shown in Fig. 15. This movement is effected by pushing-springs $s$, (see Figs. 6, 10, 11, 12,) one for each gripper-lever, applied between the said lever and one of two abutment-pieces $s'$, fast to the rock-shaft J, the said springs being coiled upon rods $s^2$, which are pivoted to the levers and which work through the said abutment-pieces. Stops $s^3$ are applied on said rods to come against said abutment-pieces, as shown in Fig. 11, to limit the outward movement of the lever.

The closing of the two sets of grippers to take opposite side edges of the packs is effected by means of a single spring $t$, which is shown in Figs. 1 and 4, but is represented in Fig. 5* with all the mechanism by which it is controlled and through which it acts on the cross-pieces $n^4$ of the gripper-rods $n^3$ to draw the gripper-jaws $n'$ toward the opposite jaws $n\ n^*$. The said spring $t$ is coiled upon a rod $t'$, which is connected with a trip-lever $t^2$, which is controlled by a cam $t^3$ on the shaft K, hereinbefore described, belonging to the respective set of packing and stacking devices. The said spring acts between a fixed abutment-post $t^4$ and a collar $t^5$ on the said rod to push the lever toward the periphery of the cam, which is so-called "snail" form. The said lever is connected by a rod $t^6$ with the downwardly-projecting arm $t^7$ of a rock-shaft $t^8$, which is arranged in bearings in fixed brackets $t^9$ on the framing A' and which has two upwardly-projecting arms $t^{10}$, connected with two bars $t^{11}$, (see Figs. 5 and 14,) which slide in fixed guides $t^{12}$ on the packing-table H, the said bars being so arranged that when the gripper-levers J* are turned inward to the position shown in Figs. 6 and 10 for taking the sheets from the packing-fence there is one of said bars under each of the gripper-rods $n^3$, as shown in Figs. 5* and 6, and an upwardly-projecting tappet 32 on the bar is in range with the downwardly-projecting toe 33 of the cross-piece $n^4$ on the gripper-rod. The cam $t^3$ being on the same shaft K with the cranks $J^{11}$, by which the gripper-carrier is moved back and forth, makes one revolution for every such movement, and the said cam during every such revolution acts upon the trip-lever $t^2$ to compress the spring $t$, the maximum of such compression occurring when the top of the step 34 of the cam arrives at the tripping-point 35 of the lever $t^2$, which it does just as the gripper-carrier arrives with the gripper open in position for the grippers to take the pack from the fence. Then the cam-step 34, passing the tripping-point of the lever, allows the lever to snap over toward the axis of the cam and permits the spring $t$ by its instantaneous action through the lever $t^2$, rod $t^6$, and the rock-shaft $t^8$ and its arms to throw back the tappet-bars $t^{11}$, which by the action of their tappets 32 on the toes of the gripper-rods $n^3$ instantly draw back the grippers $n'$ to their closed position, in which they are instantly locked by their detents $n^8$ snapping over their cross-pieces $n^4$. It may be hardly necessary to mention that the gripper-closing spring $t$ must be stronger than the two gripper-closing springs $n^7$ in order that it may overcome their constant closing tendency.

In order to allow the two operations of opening the grippers by the springs $n^7$ and of throwing the gripper-levers and grippers aside by the springs $s$ to liberate the pack by the time the pack-carriage with the gripper-levers upright arrives in the position shown in Figs. 7 and 15 for the deposit of the pack, all that is necessary is the disengagement of the two detents $n^8$ and $r$ from the gripper-rods $n^3$ and the gripper-levers J*, respectively. These disengagements are produced by two trip-levers M of bell-crank form, Figs. 1, 6, 7, 15, one for each set of grippers, which are pivoted in stands $A^3$, erected on the ends of the brackets $A^2$. On the upper arms of each of these levers are two pins $u\ u'$, represented as screw-threaded and screwed into the said lever to be adjustable therein. The said pins occupy such positions that just as the pack-carriage with the gripper-levers upright are about to so arrive the two detents $r$ are presented immediately under the pins $u$ and the detents $n^8$ are presented immediately under the pins $u'$, as shown in Fig. 15, so that by the depression of the upper horizontal arms of said levers the pins are pressed down upon the said detents and so caused to disengage them. The necessary movement of the said levers is produced by tappets $u^*$, (see Figs. 6, 7, 14 15,) secured upon the carriers $J^2$ of the pack-carriage, the said tappets as the said carriage approaches the end of its movement acting upon the downwardly-projecting arms of the said levers M, as may be understood by reference to Fig. 15. As the carriage begins its return toward the packing-fence, with the grippers open, the levers M, the movements of which are very slight, are returned by springs $v$ (see Figs. 1 and 7) against stops $v'$ on fixed pins $v^2$, which are secured in the stands $A^3$, the springs being coiled on said rods between said stands and the levers, and the stops $v'$, which are represented as nuts screwed onto said rods, are adjustable to time the operation of the tappets on the levers. The pins $u$ $u'$ being screw-threaded and tapped into the levers are also adjustable, so that the disengagement of the detent $n^8$, which keeps the grippers closed, may be effected by the pin $u'$ before the detent $r$, which engages the gripper-lever $J^*$, is disengaged by the pin $u$.

To provide for the turning of the packing-box tables I, which have been yet only briefly mentioned in the introductory paragraph of this specification, the said tables, one for each set of packing devices, are mounted on upright shafts $I^2$, as shown in Figs. 1, 2, 3, the said shafts being fitted to turn in boxes $A^4$, affixed to the sides of the bed-plate A. On each of these shafts $I^2$ is a pinion $I^3$, which meshes with one of two short-toothed racks 35, formed on a rack-bar $I^4$, which runs the whole length of the machine, as shown in Fig. 1, and is fitted to slide in guides 36 on the boxes $A^4$. The rack-bar receives a longitudinal movement in one direction or the other after each deposit of a pack of sheets in either packing-box from a grooved cam $N'$, which is formed, as shown in Figs. 4 and $4^*$, in one side of a spur-gear N, shown also in Figs. 2 and 3. The said spur-gear and cam N $N'$ are fitted to turn on a fixed stud 37, borne in a stand $A^5$ on the bed-plate A. The said spur-gear N meshes with and derives rotary motion from a spur-gear O on one of the two shafts K before described, from which the gripper-carriages derive their to-and-fro motion, the said gears N O being so proportioned that the said cam $N'$ makes one revolution for every two of each shaft K. The said cam $N'$ produces the movement of the rack-bar through a rock-shaft P, Figs. 1, 2, 3, 4, $4^*$, which is supported in fixed bearings $P'$ on the bed-plate and which has on one end an arm $P^2$, furnished with a roller $P^3$, which works in the groove of the cam $N'$. On the other end of said rock-shaft there is an arm $P^4$, which is connected by a rod $P^5$ with the rack-bar. The said rock-shaft is, as shown in Figs. 2 and 3, cranked at 38, opposite the rods $J^{10}$ of the cranks $J^{11}$, which operate the pack-carriage. This cranking is only for the purpose of permitting the movement of said rods. The length of movement of the rack-bar and the radius of the pinion $I^3$ are so proportioned that a half-revolution is given to the stacking-box tables for each longitudinal movement of the rack-bar, which takes place in one direction only during each movement of the gripper-carriage back and forth, and the said longitudinal movement being in one direction during every other movement of the carriage back and forth and in the other direction during the similar intervening movements of the carriage. By this turning of the stacking-boxes the folds produced in the sheets in the lines 14 of Fig. 2 by the folding-jaws $f$ and blades $e$ are in the successive packs arranged in opposite directions, which enables a great number of packs to be so stacked in a box that when the stack is turned out of the box by turning the latter over after its removal from its table the said packs will not slip from each other, but remain stacked both upright and substantially level.

It may be readily understood that some of the devices herein described and hereinafter claimed may be used without others of the devices. For example, a machine embodying the essential parts of this invention may be constructed without folders either for packing and stacking sheets which have not been folded or for packing or stacking sheets which may have been folded by some other means; also, that it may not always be necessary—as, for example, in the packing and stacking of unfolded sheets—to give the stacking-receptacles a turning movement for reversing the direction of the edges of the packs.

What I claim as my invention is—

1. In a machine for packing and stacking sheets, the combination of a stationary open fence, a reciprocating packer for packing sheets against said fence, and a carriage having a to-and-fro movement in relation to said fence for taking packs of sheets from and through said fence and depositing the so-taken packs in a stack, substantially as herein described.

2. In a machine for packing and stacking sheets, the combination of a stationary open fence, a reciprocating packer for packing sheets against said fence, and a carriage and attached grippers having a to-and-fro movement in relation to said fence for taking packs of sheets from and through said fence and depositing the so-taken packs in a stack, substantially as herein described.

3. The combination with a reciprocating sheet-packer, of a stationary fence having an opening the width of which is not less than that of sheets to be packed against said fence by said packer and the height of which is less than that of such sheets, substantially as herein described.

4. The combination of a stationary open fence, a reciprocating packer for packing sheets against said fence, retaining-fingers pivoted to the sides of said fence for temporarily retaining the so-packed sheets successively against said fence, and means for giving the said fingers a to-and-fro movement, substantially as herein described.

5. The combination with a reciprocating sheet-packer, of a stationary fence having an opening of not less width than that of the sheets to be packed against said fence and having at the sides of said opening in front thereof inwardly-projecting flanges the faces of which are beveled or rounded from their inner edges, substantially as and for the purpose herein described.

6. The combination of a stationary open fence, a reciprocating packer for packing sheets against said fence, retaining-fingers pivoted to the sides of said fence for retaining the so-packed sheets successively against said fence, means for giving said fingers a to-and-fro motion, and flanges on the sides of said fence projecting inwardly therefrom in front of the points of said fingers, substantially as herein described.

7. In a machine for packing and stacking sheets, the combination of a stationary open fence, a reciprocating packer for collecting sheets in packs against said fence, a stacking-receptacle for said packs, a pack-carriage with attached grippers having a to-and-fro motion between said fence and receptacle, means for turning said grippers vertically in said carriage for turning the packs therein from an upright to an approximately horizontal position, and means for opening and closing said grippers, substantially as herein described.

8. In a machine for packing and stacking sheets, the combination of a stationary open fence, a reciprocating packer for collecting sheets in packs against said fence, a stacking-receptacle for said packs, a pack-carriage with pivotally-attached grippers having a to-and-fro motion between said fence and receptacle, means for giving said grippers a lateral pivotal movement on said carriage, and means for opening and closing said grippers, substantially as herein described.

9. In a machine for packing and stacking sheets, the combination of a stationary open fence, a reciprocating packer for collecting sheets in packs against said fence, a stacking-receptacle for said packs, a pack-carriage, grippers having two independent pivotal attachments to said carriage whereby provision is made for both vertical and lateral movements therein, means for producing both said vertical and lateral movements, and means for opening and closing said grippers, substantially as herein described.

10. In a machine for folding, packing and stacking sheets, the combination of a stationary open fence, a reciprocating packer for collecting folded sheets in packs against said fence, a device for folding sheets and depositing them folded between said fence and packer, a receptacle for said packs, a pack-carriage having a to-and-fro motion between said fence and receptacle for taking said packs from said fence to said receptacle, and means for turning the said receptacle between the successive deposits of packs therein, substantially as and for the purpose herein described.

11. In a machine for folding, packing and stacking sheets, the combination of a stationary upright open fence, a reciprocating packer for collecting folded sheets in packs against said fence, a device for folding sheets and depositing them folded between said fence and packer, a receptacle for said packs, a pack-carriage and attached grippers having a to-and-fro motion between said fence and receptacle, means for turning said grippers in said carriage for turning the packs therein from an upright to an approximately horizontal position, means for opening and closing said grippers, and means for turning said receptacles for reversing the direction of the folded edges in successively-received packs, substantially as herein described.

12. In a machine for packing and stacking sheets, the combination of a stationary open fence, a reciprocating packer for collecting sheets in packs against said fence, a stacking-receptacle for said packs, a pack-carriage having grippers so pivoted therein as to be capable of a lateral motion thereon, means for giving a to-and-fro motion to said carriage between said fence and receptacle, means for producing the lateral movements of the grippers on their pivots, and means for opening and closing the grippers, substantially as herein described.

13. In a machine for packing and stacking sheets, the combination of a stationary open fence, a reciprocating packer for collecting sheets in packs against said fence, a stacking-receptacle for said packs, a pack-carriage having a to-and-fro motion between said fence and receptacle, grippers which are together pivoted in said carriage to turn vertically therein and which are separately pivoted to said carriage to turn laterally thereon, means for turning the grippers vertically in said carriage, means for turning said grippers laterally on said carriage and means for opening and closing said grippers, substantially as herein described.

14. In a machine for packing and stacking sheets, the combination of carriers and stationary guides on which said carriers are capable of a to-and-fro movement, a rock-shaft and bearings therefor on said carriers, two gripper-levers pivoted to said rock-shaft to move laterally with respect to said to-and-fro movement, corresponding gripper-jaws one on each lever and one affixed to the rock-shaft, and gripper-jaws one on each of said levers movable to and from said corresponding gripper-jaws, substantially as herein described.

15. In a machine for packing sheets and depositing them in packs, the combination with a pack-carriage, of two sets of grippers attached to said carriage for taking opposite sides of a pack, springs on the carriage for opening said grippers, detents for holding the grippers closed, trip-levers for disengaging said detents, and tappets on the carriage for actuating said trip-levers to effect said disengagement, substantially as herein described.

16. In a machine for packing sheets and depositing them in packs, the combination with a pack-carriage, of two sets of grippers and pivots which attach said grippers to said carriage and on which said grippers move laterally to said carriage for taking opposite sides of a pack, springs on said carriage for moving the grippers outward on said pivots, detents between said grippers and the carriage for holding said grippers toward the sides of the pack, trip-levers for disengaging said detents, and tappets on the carriage for actuating said trip-levers to effect said disengagement, substantially as herein described.

17. In a machine for packing sheets and depositing them in packs, the combination with a pack-carriage, two sets of grippers and pivots which attach said grippers to said carriage and on which said grippers move laterally to said carriage for taking opposite sides of a pack, springs on said carriage for moving the grippers outward on said pivots, detents between said grippers and the carriage for holding said grippers toward the sides of the pack, springs on the carriage for opening said grippers, detents for holding said grippers closed, trip-levers for disengaging both of said detents, and tappets on the carriage for actuating said trip-levers to effect said disengagement, substantially as herein described.

18. In a machine for packing sheets and depositing them in packs, the combination with a pack-carriage, of two sets of grippers attached to said carriage for taking opposite sides of a pack, springs on the carriage for opening said grippers, a spring for closing said grippers and a cam for actuating and controlling said spring to overcome the action of the first-mentioned springs, substantially as herein described.

19. In a machine for packing sheets and depositing them in packs, the combination with a pack-carriage, of two sets of grippers and pivots which attach said grippers to said carriage and on which said grippers move laterally to said carriage for taking opposite sides of a pack, springs on said carriage for moving the grippers outward on said pivots, detents between said grippers and the carriage for holding said grippers toward the sides of the pack, springs on the carriage for opening said grippers, detents for holding said grippers closed, trip-levers for disengaging both of said detents, tappets on the carriage for actuating said trip-levers to effect such disengagement, a spring and mechanism between said spring and said grippers for closing the latter, and a cam for actuating and controlling said spring to produce such closure, substantially as herein described.

20. In a machine for packing sheets and depositing them in packs, the combination with a pack-carriage and attached grippers for taking opposite sides of a pack, a spring and connected mechanism outside of the carriage for opening said grippers, and a rotary cam outside of said carriage for first producing an operative tension of said spring and afterward suddenly releasing it to produce the said opening, substantially as herein described.

21. In a machine for packing sheets and depositing them in packs, the combination with grippers for taking the sides of the packs and a spring for opening said grippers, of a spring $t$ for closing said grippers, a fixed abutment $t^4$ for said spring, a trip-lever $t^2$, a sliding tappet-bar $t^{11}$, connections between said lever and bar and between said lever and spring, a rotary cam $t^3$ for operating on said trip-lever for producing first the tension of the spring and afterward the tripping of the lever to produce the closing of the grippers, and a detent for holding the grippers closed, all substantially as herein described.

22. In a machine for packing sheets and depositing them in packs, the combination of two reciprocating carriers and guides therefor on which they have a to-and-fro movement, a rock-shaft and bearings therefor on said carriers, two sets of pack-grippers pivoted to said rock-shaft to move laterally to said to-and-fro movement, means for producing said lateral movement, means for opening and closing the grippers and means for turning the said rock-shaft in said bearings, substantially as and for the purpose herein described.

23. In a machine for packing sheets and depositing them in packs, the combination with a pack-carriage, of gripper-levers pivoted to said carriage, one on each side thereof, to be capable of moving laterally to and fro thereon, gripper-jaws formed on each of said levers, a gripper-rod sliding lengthwise within said lever and furnished with a gripper-jaw opposite that on the corresponding lever, springs applied between said rods and their respective levers for opening the gripper-jaws, and a detent on said lever for engaging with said rod for keeping the grippers closed, substantially as herein described.

24. In a machine for packing sheets and depositing them in packs, the combination with a reciprocating pack-carriage, of gripper-levers one at each side of the carriage and each furnished with a pair of gripper-jaws, pivots one for each lever on which it is capable of moving laterally to the carriage, arms one on each pivot, fixed stops one for each of said arms for the purpose of producing the movement of the gripper-levers in an inward direction by the movement of the carriage for taking the packs, and detents between said levers and carriage for locking the levers in said direction, substantially as herein described.

25. In a machine for packing and stacking sheets, the combination of carriers and stationary guides on which they are capable of a to-and-fro movement, a rock-shaft and bearings therefor in said carriers, grippers on said rock-shaft for taking opposite sides of a pack of sheets, and means for turning said rock-shaft and grippers to change the position of the pack in the grippers from an upright to a substantially horizontal, substantially as herein described.

26. In a machine for packing and stacking sheets, the combination of carriers and stationary guides on which they are capable of a to-and-fro movement, a rock-shaft and bearings therefor in said carriers, grippers on said rock-shaft for taking opposite sides of a pack of sheets, a stationary cam, and an arm on the rock-shaft engaging with said cam for producing the turning of said rock-shaft and grippers to change the position of the pack in the grippers from upright to substantially horizontal and vice versa by the to-and-fro movement of the carriage, substantially as herein described.

In testimony that I claim the foregoing as my invention I have signed my name, in presence of two witnesses, this 28th day of March, 1902.

RALPH C. SEYMOUR.

Witnesses:
FREDK. HAYNES,
GEORGE BARRY, Jr.